United States Patent
Watters et al.

(10) Patent No.: US 11,582,924 B2
(45) Date of Patent: Feb. 21, 2023

(54) GROWING MEDIA COMPOSITION

(71) Applicant: AQUATROLS CORPORATION OF AMERICA, Paulsboro, NJ (US)

(72) Inventors: Arianna Lubomyra Watters, Philadelphia, PA (US); Darryl Ramoutar, Delaware, OH (US); Casey Edward McDonald, Delaware, OH (US); Lauren M. Atkinson, Harwinton, CT (US)

(73) Assignee: AQUATROLS CORPORATION OF AMERICA, Paulsboro, NJ (US)

( * ) Notice: Subject to any disclaimer, the term of this patent is extended or adjusted under 35 U.S.C. 154(b) by 0 days.

(21) Appl. No.: 17/327,143

(22) Filed: May 21, 2021

(65) Prior Publication Data
US 2021/0360882 A1   Nov. 25, 2021

Related U.S. Application Data

(60) Provisional application No. 63/028,306, filed on May 21, 2020.

(51) Int. Cl.
*A01G 24/28* (2018.01)
*A01G 24/15* (2018.01)

(52) U.S. Cl.
CPC .............. *A01G 24/28* (2018.02); *A01G 24/15* (2018.02)

(58) Field of Classification Search
CPC ........ A01G 24/28; A01G 24/15; A01G 24/00; A01N 57/20; A01N 25/30; A01N 2300/00; A01N 43/16; B09C 1/10; B09C 1/05; C02F 3/344
See application file for complete search history.

(56) References Cited

U.S. PATENT DOCUMENTS

| 5,767,090 | A | 6/1998 | Stanghellini et al. |
| 7,985,722 | B2 | 7/2011 | Desanto |
| 8,680,060 | B2 | 3/2014 | Awada et al. |
| 9,992,998 | B2 * | 6/2018 | Ju .................... A01N 43/16 |
| 10,843,244 | B2 * | 11/2020 | Reynolds ............. C02F 3/344 |
| 2016/0249604 | A1 | 9/2016 | Giessler-Blank et al. |
| 2016/0278373 | A1 | 9/2016 | Awada et al. |
| 2017/0265468 | A1 | 9/2017 | Ju et al. |
| 2018/0163203 | A1 | 6/2018 | Bennett et al. |

(Continued)

FOREIGN PATENT DOCUMENTS

EP   2 949 214 A1   12/2015
WO   2019177174 A1   9/2019

OTHER PUBLICATIONS

Scheglova et al.; "Influence of Microbial Surfactants on the Growth of Legumes"; Aug. 3, 2015, pp. 76-81, Biotgechnologia Acta V. 8, No. 1, 2015; http://www.biotechnology.kiev.ua/index.php?option=com_content&...6%3A2015-3-17-11-42-12&catid=95%3A2015--1&Itemid=120&lang=en.

(Continued)

*Primary Examiner* — Kent L Bell
(74) *Attorney, Agent, or Firm* — Ohlandt, Greeley, Ruggiero and Perle, LLP

(57) ABSTRACT

A growing media composition includes peat and a biosurfactant produced by only mechanical and biological processes without chemical reaction that would result in any structural alteration to the biosurfactant molecule. The biosurfactant can be a glycolipid such as a rhamnolipid.

8 Claims, 6 Drawing Sheets

(56) References Cited

U.S. PATENT DOCUMENTS

2019/0218499 A1   7/2019   Farmer et al.

OTHER PUBLICATIONS

International Search Report dated Aug. 24, 2021 for PCT Appl. No. PCT/US2021/033621.
Written Opinion dated Aug. 24, 2021 for PCT Appl. No. PCT/US2021/033621.
International Preliminary Report on Patentability (IPRP) dated Jul. 19, 2022 for PCT Appl. No. PCT/US2021/033621.

* cited by examiner

GROWING MEDIA COMPOSITION

CROSS REFERENCE TO RELATED APPLICATIONS

This application claims the benefit of U.S. Provisional Patent Application No. 63/028,306, filed May 21, 2020, which is incorporated by reference herein in its entirety.

BACKGROUND OF THE DISCLOSURE

1. Field of the Disclosure

The present disclosure is directed to an enhanced growing media. More particularly, the present disclosure is directed to a growing media composition having a biosurfactant.

2. Description of Related Art

Surface-active agents also called surfactants are amphiphilic molecules having a non-polar hydrophobic portion attached to a polar hydrophilic portion. Surfactants are known to decrease surface tension. It has been long considered that a surfactant with greater surface tension reduction is a better performing surfactant and more effective wetting agent.

Surfactants find uses in agrochemicals and agriculture. For example, surfactants enable formulations to adhere to target surfaces and spread over a large area, facilitating wetting and movement of water in hydrophobic substrates. In spite of the known roles of surfactants in agrochemicals, fundamental surfactant studies in formulation preparation and optimization of biological efficacy are, to date, far from satisfactory.

In all formulations, surfactant is crucial to enhance and optimize biological efficacy. However, such is an oversimplification. Selection of surfactant in an agrochemical formulation is critical because of the number of functions that must be performed. Moreover, due to the complex nature and lack of understanding of the mode of action of the chemical, surfactant selection is often made by a trial and error procedures from an infinite number of possibilities, without predictability.

The vast majority of commercially available growing media surfactants are synthetic products. Yucca-based products are an organic alternative to these synthetic products and also meet the Organic Materials Review Institute (OMRI) and National Organic Program (NOP) guidelines. While biodegradable and non-toxic in the form and use rates used in agriculture, yucca-based products are not comparable in performance to synthetic counterpart products.

Accordingly, it has been determined by the present disclosure that there exists and has been a need for an eco-friendly biosurfactant product with performance comparable to a synthetic surfactant without the toxicity and/or better than current organic options, namely yucca.

SUMMARY OF THE DISCLOSURE

The present disclosure provides a growing media composition having effective wetting and rewetting properties.

The present disclosure provides a growing media composition effective for improving initial water uptake and/or water retention over time of a plant or agricultural substrate and is suitable itself as a plant or agricultural substrate.

A growing media composition according to the present disclosure includes a biosurfactant produced by only mechanical and biological processes without chemical reaction or changes to the molecule and growing media.

The above summary is not intended to describe each disclosed implementation, as features in this disclosure can be incorporated into additional features as detailed herein below unless clearly stated to the contrary.

DETAILED DESCRIPTION OF THE DISCLOSURE

The present disclosure has found that a growing media composition containing growing media such as peat, peat-like materials, perlite, sand, vermiculite, and/or combinations thereof; and a biosurfactant such as a glycolipid, a polymeric surfactant, a lipopeptide, a fatty acid, a particulate surfactant, a phospholipid, and/or combinations thereof, is an effective product for improving initial water uptake or wetting, rewetting, and/or water retention over time of a plant or agricultural substrate and is suitable itself as a plant or agricultural substrate.

As contemplated by the present disclosure, a biosurfactant is a generally low molecular weight microbial product having effective surface activity. This includes lowering the surface and interfacial tension between different phases. For example, the phases include between two liquids, between a gas and a liquid, or between a liquid and a solid.

Advantageously, bacteria, yeasts, and fungi can be induced to produce biosurfactants. Critically these surfactants do not undergo any chemical reaction, heat or other processes that would change the structure of the molecule.

As used herein, the term biosurfactant means, a surfactant that exists in nature or is produced by biological processes without any external inputs. Biosurfactants are organic. A material is not considered organic if a chemical reaction or transformation occurs, with or without the addition of heat. If a molecule that exists in nature is s synthetically produced, even though chemically identical, the molecule is not considered organic according to the present disclosure.

Biosurfactants are classified based on molecular structure. Certain classes of biosurfactants exhibit greater surface tension reduction than others.

The effectiveness of a surfactant is characterized by how significant of a surface tension reduction can they provide, or how low of a concentration in water is needed to provide a desired surface tension reduction. However, it has been surprisingly found by the present disclosure that surface tension reduction does not correlate with performance as a peat wetter.

Figure 1:
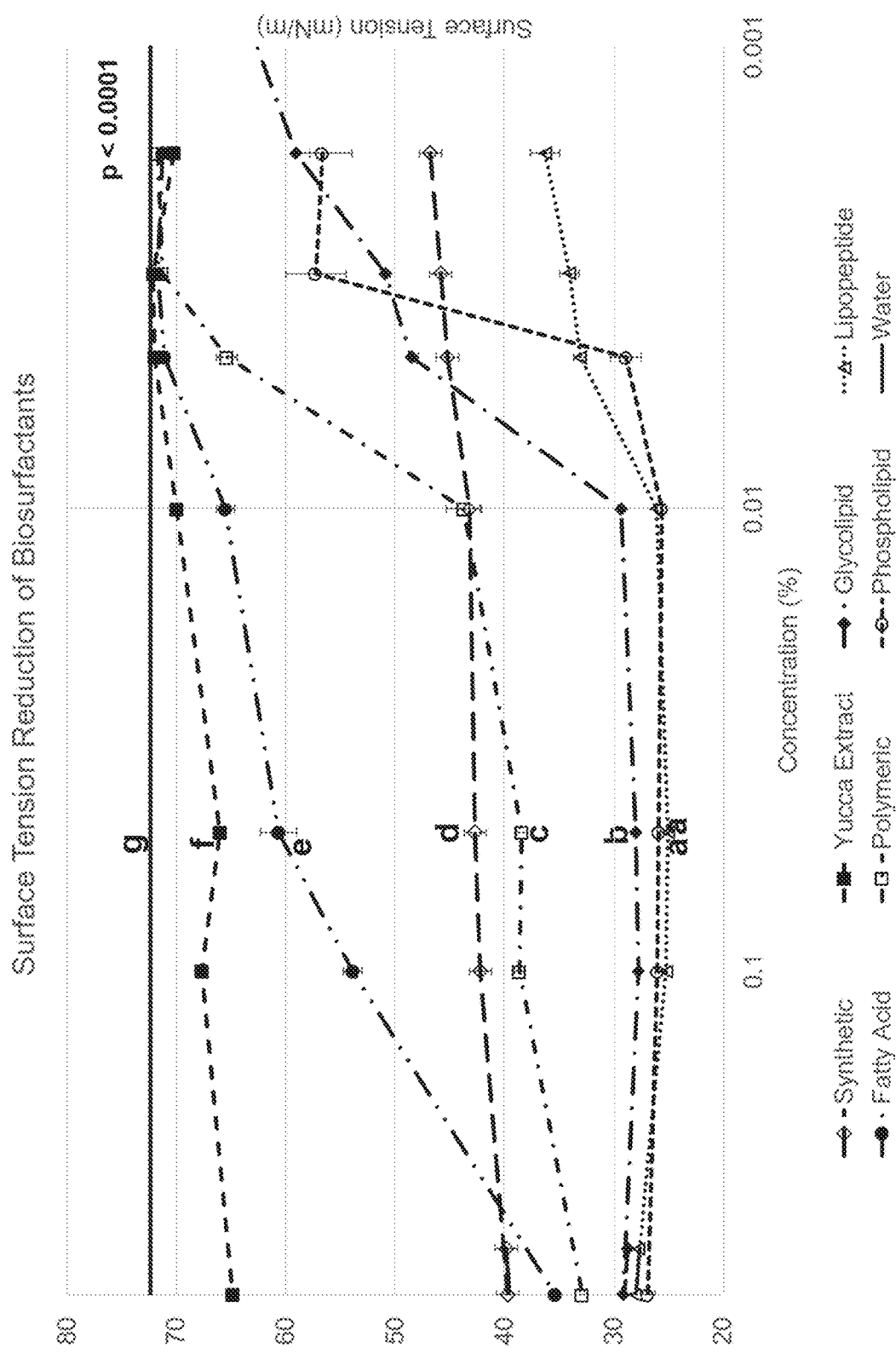
FIG. 1 is a plot showing surface tension reduction of biosurfactants.

For example, referring to FIG. 1, it is shown that at 0.05% solution, phospholipids and lipopeptides exhibit the greatest reduction in surface tension, while all other surfactants show statistically significant differences. Phospholipids and lipopeptides far outperform synthetic surfactants and the commercially available yucca. That is, phospholipids and lipopeptides provide a surface tension reduction that is statistically significant over other classes. Thus, FIG. 1 provides an expected order of performance based on a measure of surface tension reduction at 0.05% in DI water.

Glycolipids are lipids with a carbohydrate attached by a glycosidic bond and can include without limitation, sophorolipids, rhamnolipids, trehalose lipids, and mannosylerytitol lipids.

Rhamnolipid biosurfactant is a naturally occurring extracellular glycolipid that is found in soil and on plants. Rhamnolipid biosurfactant contains rhamnose as the sugar moiety (hydrophilic) linked to beta-hydroxylated fatty acid chains (hydrophobic).

Rhamnolipid biosurfactants can be produced through microbial fermentation process of soy. *Pseudomonas aeruginosa* is the most competent microbe that can be induced to produce rhamnolipids. Rhamnolipid biosurfactant is recovered from the fermentation broth after sterilization and centrifugation, then purified to various levels to fit intended applications.

Sophorolipid biosurfactant is a surface-active glycolipid that contains glucose-derived di-saccharide sophorose (hydrophilic) linked to fatty acid tail chain (hydrophobic).

Sophorolipid biosurfactant can be produced by a fermentation process of a number of non-pathogenic yeasts species, a gravity separation process, and an optional purification process.

The present disclosure has found that choice of yeast can influence distribution of lactone vs acidic forms of final molecule, and subsequently, performance. An example non-pathogenic yeast is *Candida apicola*, among others.

Polymeric surfactants are defined by the repeating units in the chemical structure, considered a high-mass biosurfactant. Non-limiting examples of polymeric biosurfactants include Emulsan Liposan Lipomanan Alasan Biodispersan Lipopeptides are molecules consisting of a lipid and a peptide, and have the unique ability to self-assemble into various structures. Non-limiting examples of lipopeptides biosurfactants include Surfactin and Lichenysin.

Surfactin is a bacterial cyclic lipopeptide. Surfactin biosurfactant has seven amino acids bonded to the carboxyl and hydroxy groups of the 14th-carbon fatty acid.

Surfactin biosurfactant can be produced by a bacterial cyclic lipopeptide and is recognized as one of the most effective biosurfactants, decreasing surface tension of water at rates as low as <0.01%

Surfactin biosurfactant can be produced by submerged or solid-state fermentation processes followed by purification processes including membrane-based techniques, foam fractionation, extraction, adsorption, liquid membrane extraction, and combinations thereof.

Microorganisms *Bacillus, Pseudomonas*, or *Candida* can be induced to produce Surfactin. Advantageously, microorganisms can be paired with reaction type to optimize Surfactin output.

Fatty acids are carboxylic acids with long aliphatic, or carbon-hydrogen chains. Most fatty acids that are naturally occurring have an aliphatic chain containing an even number of carbon atoms, usually less than or equal to 30 carbon atoms. Fatty acid type is defined by the number of carbon atoms, even vs. odd number of carbon atoms, and saturation. Unsaturated fatty acids contain a minimum of one carbon-carbon double bond, hence influencing the molecule's properties.

Particulate surfactants are produced by *Acinetobactor calcoaceticus*, cyanobacteria, or *Pseudomonas marginalis*, among others. Particulate biosurfactants are another example of a high-mass biosurfactant due to their membrane vesicle or whole-cell structure.

Phospholipids are molecules that contain a hydrophilic phosphate head attached to two hydrophobic lipid tails, and are naturally produced by *Acinetobactor* sp., *Aspergillus*, and *Corynebacterium lepus*, among others. Phospholipids are most commonly known to be a primary component of biological membranes.

Growing media, as used herein, is the material in which plants grow.

Growing media functions to supply roots with nutrients, including macronutrients and micronutrients, oxygen from the air, and water. Growing media also allows root growth and root spread to enable the plant to physically support itself.

Growing media can include agricultural soils including sand, silt and clay.

Growing media can include soilless growing media. Examples of such growing media include peat, peat-like materials, coconut coir, perlite, bark fines, vermiculite, sand, and rice hulls.

Growing media can also include combinations of agricultural soils and soilless growing media.

As used herein, the term peat describes a material that is soil-like in nature, comprised of partly decayed organic matter. Peat contains relatively large pores or spaces with irregular and interconnected structures. Peat is hydrophobic in nature.

Peat is found in the wet conditions of swamps, bogs or peatlands, and collected to be used in agricultural and other applications.

For example, peat is controlled to have a total porosity from about 70% to about 97%.

For example, peat is controlled to have a density from about 0.018 to about 0.260 g/cm$^3$, preferably about 0.020 to about 0.254 g/cm$^3$.

Non-limiting examples of peat include, e.g., sphagnum moss, herbaceous, well decomposed, and the like.

As used herein, peat-like materials include bark, wood fibers, coconut coir, compost and biosolids.

Preferably, growing media for a growing media composition according to the present disclosure includes peat.

Growing media for a growing media composition according to the present disclosure may also include peat-like materials, perlite, sand, and vermiculite.

Growing media for a growing media composition according to the present disclosure includes combinations of any of the aforementioned, e.g., peat and peat-like materials.

Growing media for a growing media composition according to the present disclosure includes combinations of peat and peat-like materials and at least one of perlite, sand, and vermiculite.

Peat preferably exhibits the following properties, i.e. moderate air space, moderate dry-out rate, no nutrients, highly acidic, and very poor wettability.

Perlite preferably exhibits the following properties, i.e. very high air space, fast dry-out rate, no nutrients, alkaline, and good wettability.

Sand preferably exhibits the following properties. low air space, moderate dry-out rate, few nutrients, slightly acidic to alkaline, and good wettability.

Vermiculite preferably exhibits the following properties, i.e. high air space, moderate dry-out rate, few nutrients, alkaline, and good wettability.

Bark preferably exhibits the following properties, i.e. high air space, fast dry-out rate, few nutrients, acidic, and poor wettability.

Coir preferably exhibits the following properties, i.e. moderate air space, moderate dry-out rate, moderate in CI, K, and Na, slightly acidic, and good wettability.

Compost preferably exhibits the following properties, i.e. very low air space, slow dry-out rate, high in nutrients, slightly acidic to alkaline, and poor wettability.

Plant roots grow in the spaces between individual particles of the growing media. Likewise, air and water permeate these spaces. Water is the medium that carries nutrients that plants need to fuel their growth. Air is needed for root growth and the health of soil microorganisms that help supply plants with nutrients. During irrigation water moves through the spaces, displacing the air. If excess water is not taken up by the plant and unable to drain away, fresh air cannot enter. Consequently, roots can be damaged.

The present disclosure has found that although yucca-based surfactants decrease surface tension, yucca-based surfactants exhibit poor water uptake and water retention, particularly in hydrophobic growing media compositions compared to synthetic surfactants.

The present disclosure has found that microbial biosurfactants, including glycolipids, polymeric surfactants, lipopeptides, fatty acids, particulate surfactants, phospholipids, and/or combinations thereof, have been found to exhibit superior performance in wettability and/or water retention, and subsequently improved nutrient delivery in hydrophobic substrates. These biosurfactants are readily soluble in water.

Preparation of a growing media composition according to the present disclosure will now be described.

As noted above, the subject biosurfactants of the present disclosure can be producible with bacteria, yeasts or fungi, through the processes of fermentation, microbial digestion or other related methods.

The subject biosurfactants of the present disclosure can be isolated, for example, by a purification process. Purification is a mechanical process that separates the biosurfactant from other undesired products, such as, but not limited to, distillation or filtration, without chemical changes to the structure of the molecule.

Growing media is mixed with a biosurfactant.

For example, the application rate in ounces of bio surfactant per cubic yard ($oz/y^3$) of growing media is from about 0.01 or 0.05 or 0.10 or 1.0 to about 12.0, in other examples from about 0.10 or 0.5 or 1.0 to about 10.0, and in yet other examples from about 0.01 or 0.05 or 0.10 or 1.0 to about 8.0.

Further for example, the application rate in $oz/yd^3$ of growing media is from about 1.0 or 1.5 or 2.0 to about 12.0, in other examples from about 1.0 or 1.5 or 2.0 to about 10.0, and in yet other examples from about 1.0 or 1.5 or 2.0 to about to about 8.0.

Notably, at a concentration of 12 $oz/yd^3$ (4.5% solution), which is the upper end of the commercial application rate, yucca provides a surface tension reduction of 49.85 mN/m. Whereas, a similar surface tension reduction is achieved by glycolipid biosurfactant at a significantly lower concentration of 0.003% resulting in 50.95 mN/m.

The biosurfactant can be in the form of a solid or a liquid.

In examples in which the biosurfactant is a solid, the solid can be ground to a powder and directly mixed with the growing media at a selected application rate.

For example, the biosurfactant is can be 100% glycolipid at 90% purity. The glycolipid can be rhamnolipid.

Additionally, the biosurfactant has a purity of at least 80%, at least 91%, at least 92%, at least 93%, and at least 95%. In yet other examples glycolipid biosurfactant purity levels range from about 80% to about 98%, about 85 to about 96%, and about 92 to about 94%, including subranges therebetween. The glycolipid can be rhamnolipid.

The glycolipid can be solid rhamnolipid, which is a chunky brown material with irregular shaped granules up to approximately 5 mm diameter in size. By pulverization, a more uniform dispersion throughout the grow media will occur during the mixing.

Mixing can be performed by, for example, a drum blender, a tumbler mixer, a palled mixer, a trough mixer, and the like.

The mixing causes particles of biosurfactant to dispersed throughout the media.

In examples in which the biosurfactant is a liquid, the biosurfactant is prepared in a solution with water.

The liquid is at least about 18%, at least about 20%, at least about 22%, or at least about 24% glycolipid in solution with at least about 85%, about 90%, or about 95% purity. The glycolipid can be rhamnolipid.

The liquid can be between about 0.5% to about 50% biosurfactant in solution, preferably between about 10% to about 40%, and most preferably between about 18% to about 33%. In yet other examples, the liquid is between about 23% to about 27% biosurfactant in solution. The purity can be at least 80%, 81%, 82%, 83%, 84%, 85%, 86%, 87%, 88%, 89%, 90%, 91%, 92%, 93%, 94% or 95% purity.

The biosurfactant preferably has a purity of at least about 80% to about 95%. In yet other examples glycolipid biosurfactant purity levels range between about 80% to 98%, preferably between about 85 to about 96%, and more preferably between about 92 to about 94%, including subranges therebetween. The glycolipid can be rhamnolipid.

Preferably, the concentration of biosurfactant in water is from about 0.1% by volume to about 50% by volume, more preferably from about 0.2% by volume to about 10% by volume, and most preferably from about 0.2% by volume to about 5% by volume.

After the solution of biosurfactant is prepared, the solution is added to the grow media.

The biosurfactant solution can be mixed into the media using various methods, for example, by manually mixing, pouring of the solution over the grow media with subsequent mixing in an enclosed vessel, sprayed application while media is under agitation in a large vessel, and the like.

Advantageously, owing to its properties, the solution of biosurfactant spreads throughout the grow media and adhesion of the biosurfactant to the surface of the media occurs.

After the solution is mixed into the media, the resultant mixture is dried in a manner that does not cause a chemical change to the structure of the biosurfactant molecule.

Drying processes can include, for example, air drying. Air drying is performed for at least about 24 hours, preferably from about 24 to about 48 hours, and more preferably from about 24 to about 36 hours to remove excess water from the mixture.

A target moisture content prior to testing is preferably about 10% moisture or less.

Growing media compositions according to the present disclosure have a target pH in the range between about from 4.8 to 6.2, 5.0 to 6, and 5.0 to 5.8.

Growing media compositions according to the present disclosure have an air porosity by volume of between about 9% to 21%, including 10%, 11%, 12%, 13%, 14%, 15% 16%, 17%, 18%, 19%, and 20%, and ranges therebetween.

Without wishing to be bound by a single theory, it is suspected that higher purity level results in superior performance.

A grow media product according to the present disclosure can be applied directly to a plant or agricultural substrate in a ratio of about: 1 to 2, 1 to 3, 1 to 4, or 1 to 5, of growing media composition to plant or agricultural substrate. In these such examples, the application rate of biosurfactant to the growing media composition is adjusted proportionally.

Combinations of biosurfactant are envisioned, including, but not limited to, rhamnolipids and yucca, rhamnolipids and surfactin, rhamnolipids and yucca and surfactin, rhamnolipids alone, and surfactin alone.

EXPERIMENTAL

Studies were initially carried out with an application rate of 6 oz/yd$^3$ of growing media. This application rate is comparable to the widely accepted use rate for the commodity synthetic surfactants.

Figure 2:
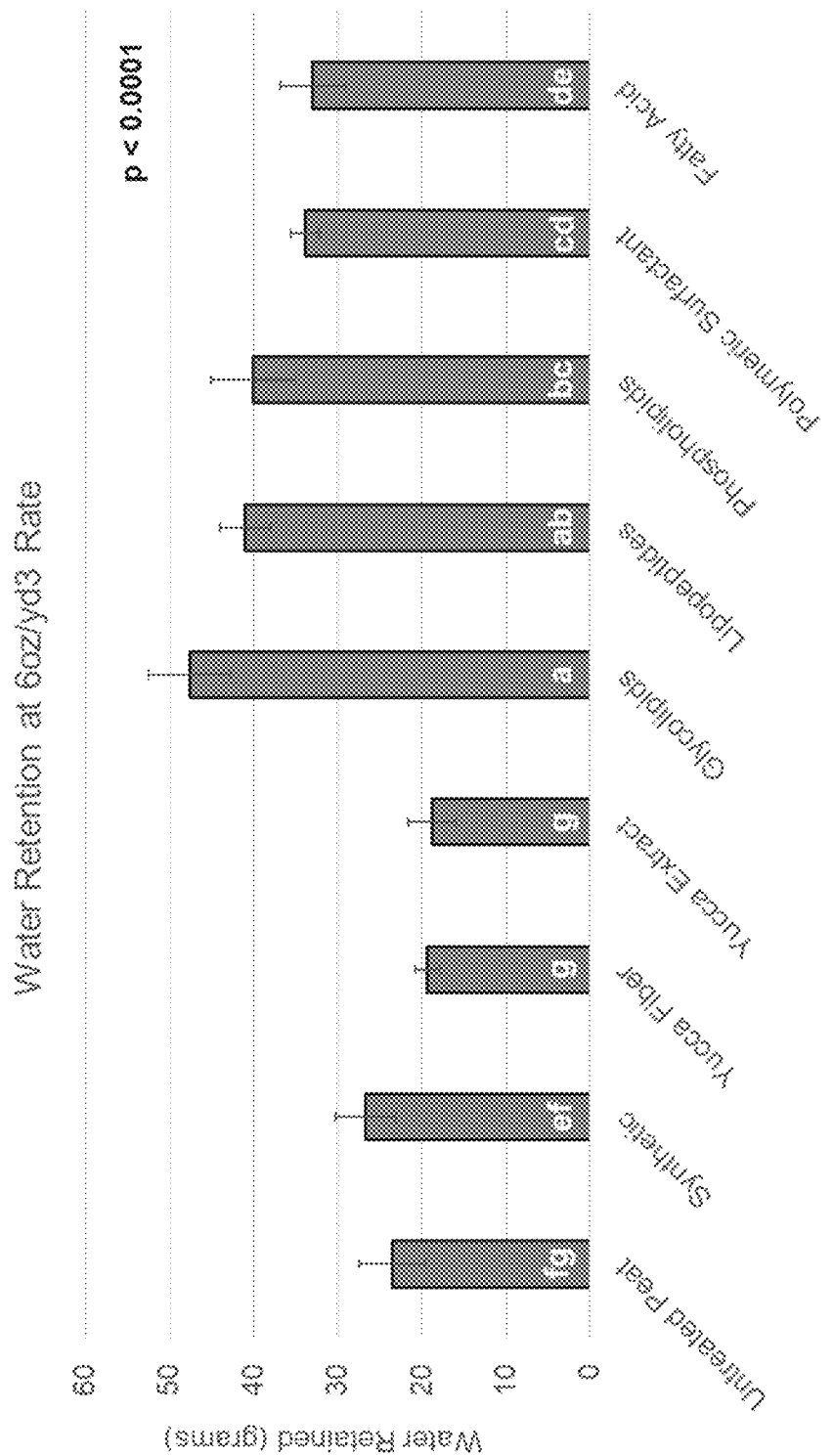
FIG. 2 is a graph showing comparative water retention of biosurfactants.

Water retention was assessed. The results are shown in FIG. 2.

Prior to evaluation, peat moss was dried until it contained <20% water, pH 5-7.

To evaluate wetting effectiveness, the dried peat was treated with surfactants at 6 oz/yd$^3$ of grow media to yield a growing media composition and divided into 50 g portions in triplicate for each condition. The portions were added to nursery pots. Filter paper was used to ensure peat did not escape through drainage holes. An initial weight of the container and peat was measured. 300 mL of water was then slowly poured over the growing media composition carefully to ensure the water would flow through the peat rather than down the sides of the nursery pot. Once the nursery pots were no longer dripping, the water that was retained by growing media composition was measured by measuring the final weight of the container, peat, and retained water. Water retention was recorded a total of three times, with ample time to fully dry between each application of water, namely, about 7 to 10 days. The results are shown in FIG. 2. The number of days required to dry between each hydration event was also recorded.

The industry accepted use rate for yucca fiber is approximately equivalent to a liquid application of 8.5 oz/yd$^3$. At this higher application rate, yucca fiber performance falls short of the common synthetic product at a lower use rate of 6 oz/yd$^3$.

Glycolipids surprisingly exhibit the most significant improvements in water retention. This improvement could not have been predicted by surface tension measurements.

Water Retention of Glycolipids at various use rates is summarized in Table 1 and Table 2 below.

TABLE 1

| Use Rate (oz/yd$^3$) | Test Surfactant (mL) |
| --- | --- |
| 6 | 0.94 |
| 4 | 0.62 |
| 2 | 0.32 |
| 1 | 0.16 |
| | Add this amount of surfactant to 40 mL water to treat 600 g peat |

TABLE 2

| Water Retention of Glycolipids | | |
| --- | --- | --- |
| Application Rate | Water Retained (grams) | Standard Deviation |
| Untreated Peat | 23.50 | 3.95 |
| 2 oz/yd3 | 27.13 | 3.28 |
| 4 oz/yd3 | 36.33 | 3.27 |
| 6 oz/yd3 | 47.63 | 4.81 |
| 8.5 oz/yd3 | 90.43 | 3.60 |

Figure 3:
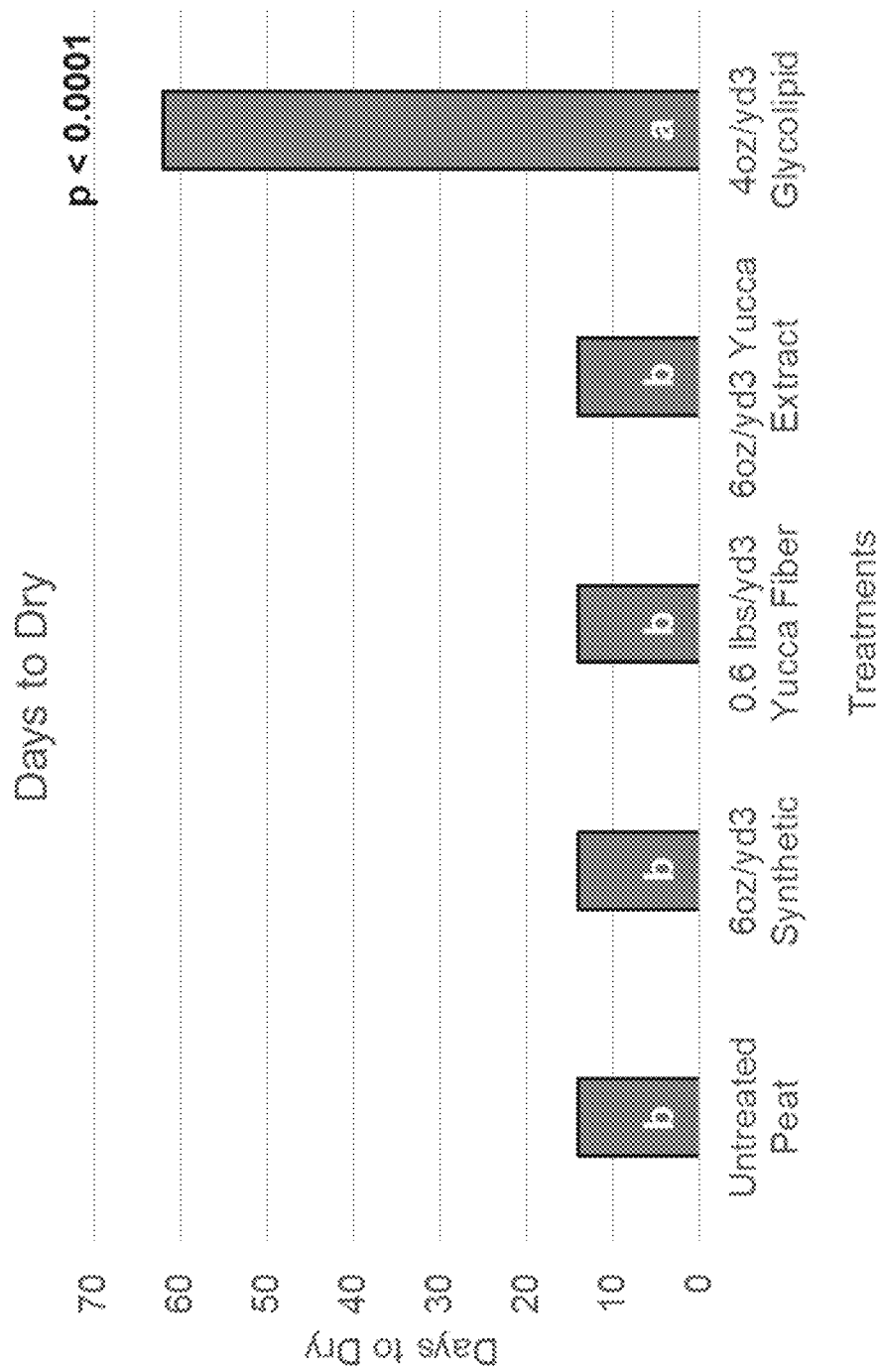
FIG. 3 is a graph showing comparative days to dry of biosurfactants.

Together with water retention, time or days to dry was also assessed. The results are shown in FIG. 3.

4 oz/yd$^3$ glycolipid treatment required a total of 62 days of dry time throughout the duration of the water retention study. Untreated peat, synthetic surfactant, yucca extract and yucca fiber all required only 14 days of dry time during the duration of the test.

Surprisingly, biosurfactants retain water in soilless media over four times as long as yucca and synthetic surfactants.

Figure 4:
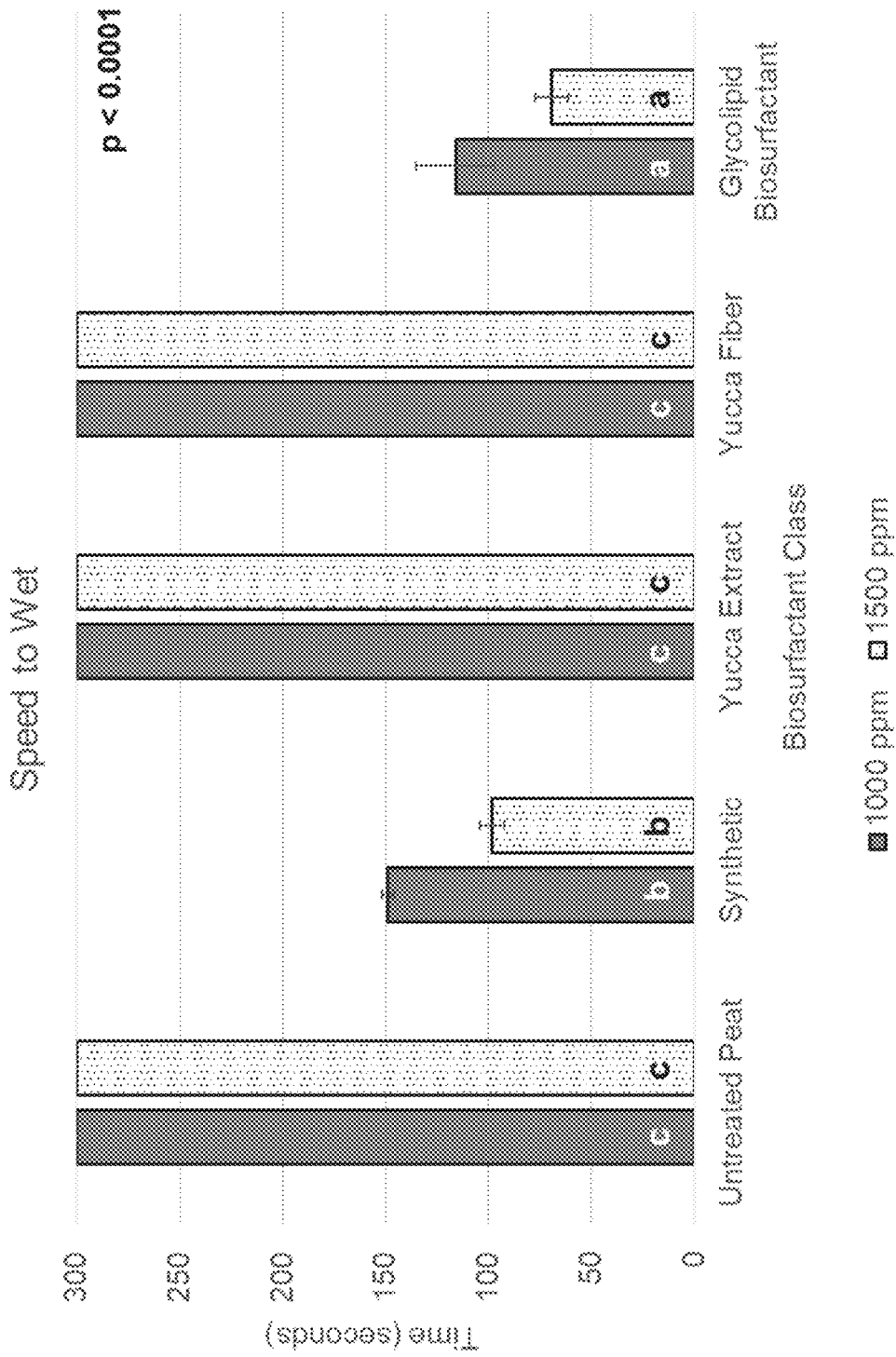
FIG. 4 is a graph showing comparative speed to wet of biosurfactants.

A speed to wet study was conducted. The results are shown in FIG. 4. Dry peat and yucca, the only commercial biosurfactant were used as a benchmark.

Prior to evaluation, peat moss was dried until it contained <20% water, pH 5-7

A solution containing 1000 ppm and 1500 ppm concentrations for each surfactant being evaluated was prepared. 50 mL of each solution was poured into a beaker at room temperature. 300 mg of dry peat was measured and added to the solution. The time it took the solution to completely wet the peat was recorded. Tests over a period of 300 seconds or 5 minutes were terminated. Yucca extract exceeded the 300 second limit and, thus, the test was terminated. Lipopeptides tended to perform similar to yucca. In contrast, glycolipids exhibited improved water uptake versus synthetic surfactant at both concentrations evaluated. For each surfactant, at least three replications occurred. Glycolipids surprisingly exhibit superior performance in speed to wet compared to yucca extract at 1000 and 1500 ppm solutions. Glycolipids also exhibit a faster speed to wet when compared to a widely used synthetic surfactant. [[Can we provide the name?]]

A hydration index (HI) study was conducted to explore the relationship between wettability and hydration. HI provides a single number for wettability. HI compares initial wettability with the maximum water held by the sample. An HI of 0.80 or higher indicates that the potting soil should hydrate sufficiently.

Figure 5:
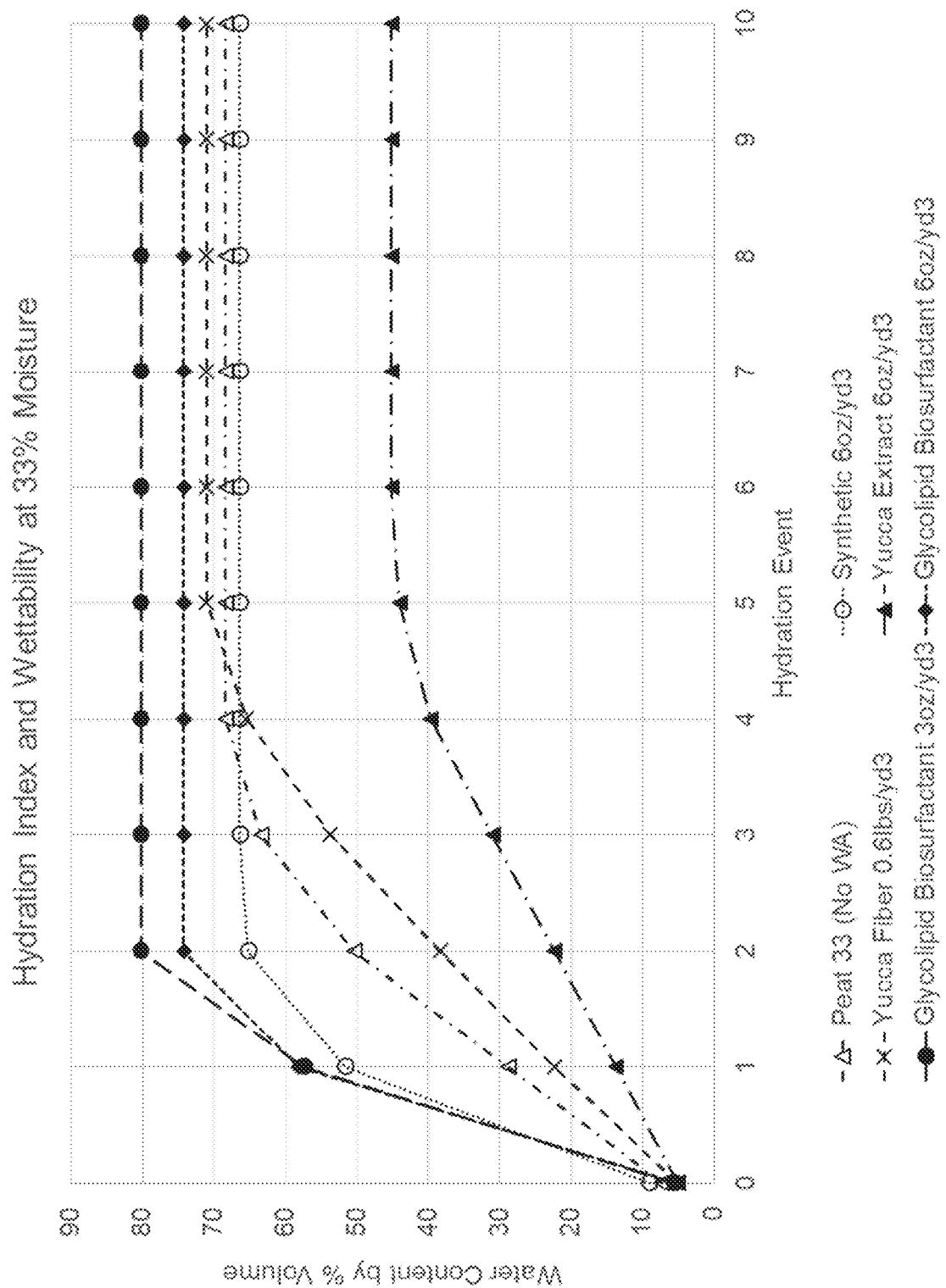
FIG. 5 is a plot showing hydration index and wettability at 33% moisture.
Figure 6:
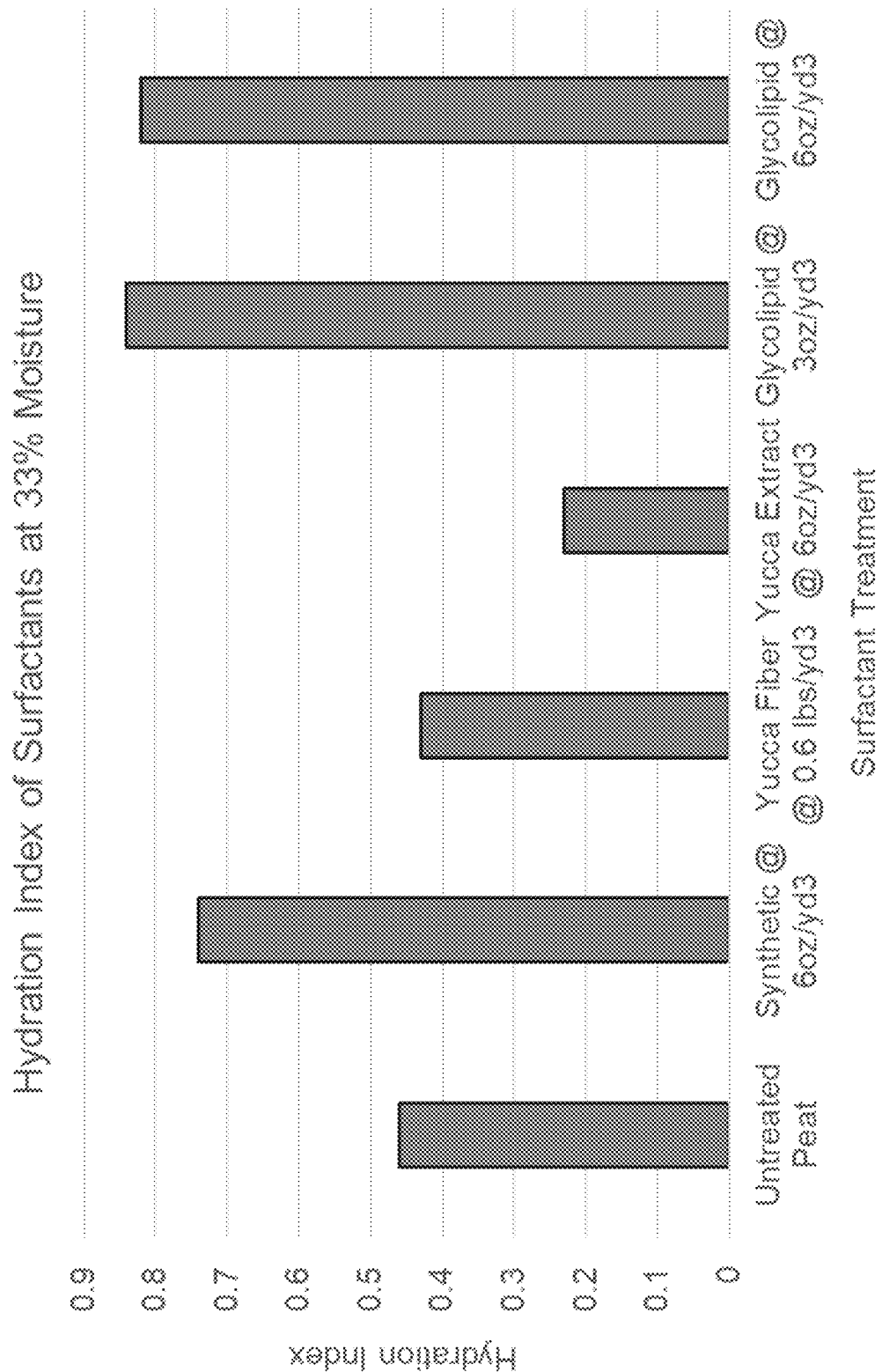
FIG. 6 is a graph showing comparative hydration indices of biosurfactants.

Results of the HI study are summarized in FIGS. 5 and 6. HI tests are reported at 33% moisture because commercial peat products are sold at 30-40% moisture this mimics the actual hydrophobicity of the end use product.

The initial slope of the plots in FIG. 5 represents the wettability or initial affinity to hold onto water. The subsequent plateau represents the water holding capacity of the peat. If the plateau occurs with less hydration events, the HI will be a higher value.

The HI is calculated by formula A:

$$HI = \frac{\text{sum of water retained over first three hydration events}}{\text{maximum water retained at 10th hydration event}}$$

When evaluated at 33% moisture, glycolipid biosurfactant exhibited the greatest water holding capacity and reached the maximum capacity in the least amount of hydration events. Glycolipid biosurfactant exhibited the highest HI of >0.80. Again, HI compares initial wettability with the maximum water held by the sample Yucca fiber exhibited minimal improvements over untreated peat, while yucca extract decreased water holding capacity. Yucca extract and yucca fiber exhibited HI less than that of untreated peat, suggesting it is not positively contributing to initial wettability or maximum water held by the sample.

Synthetic surfactant initially wet quickly but did not improve water holding capacity. Synthetic surfactant exhibited an improvement over untreated peat, however half the amount of glycolipid biosurfactant still outperforms the synthetic alternative.

Without wishing to be bound by a single theory, a growing media composition according to the present disclosure facilitates an enhanced penetration of the molecules through fine pores of the growing media composition. The hydrophobic portion of the biosurfactant is attracted to the hydrophobic peat during the application process, leaving the hydrophilic portion available to interact with hydrophilic moieties, such as water, enhancing water retention, wetting, and spreading. As a result of the growing media composition having a reduced surface tension, molecules can more effectively overcome the capillary (surface) forces. These forces produce a high-pressure gradient that is proportional to the surface tension of the chemicals. The low surface tension of the growing media composition yields a lower pressure gradient and higher the rate of penetration. In addition, the growing media composition has increased solubilization results and therefore in an increase in the concentration gradient that in turn enhances the flux due to diffusion, for example, with consideration of Fick's first law.

SFT does not predict behavior of biosurfactant classes in peat wetting applications; each class of biosurfactants provided a unique combination of performance benefits This work is the first example of biosurfactants being evaluated for soilless media applications Glycolipid biosurfactants exhibited superior performance across all metrics, outperforming both synthetic surfactants and yucca extract and fiber, the current commercially available biosurfactants It should be noted that the terms "first", "second", and the like can be used herein to modify various elements. These modifiers do not imply a spatial, sequential or hierarchical order to the modified elements unless specifically stated.

As used herein, the terms "a" and "an" mean "one or more" unless specifically indicated otherwise.

As used herein, the term "substantially" means the complete or nearly complete extent or degree of an action, characteristic, property, state, structure, item, or result. For example, an object that is "substantially" enclosed means that the object is either completely enclosed or nearly completely enclosed. The exact allowable degree of deviation from absolute completeness can in some cases depend on the specific context. However, generally, the nearness of completion will be to have the same overall result as if absolute and total completion were obtained.

As used herein, the term "comprising" means "including, but not limited to; the term "consisting essentially of" means that the method, structure, or composition includes steps or components specifically recited and may also include those that do not materially affect the basic novel features or characteristics of the method, structure, or composition; and the term "consisting of" means that the method, structure, or composition includes only those steps or components specifically recited.

As used herein, the term "about" is used to provide flexibility to a numerical range endpoint by providing that a given value can be "a little above" or "a little below" the endpoint. Further, where a numerical range is provided, the range is intended to include all numbers within the numerical range, including the end points of the range.

While the present disclosure has been described with reference to one or more exemplary embodiments, it will be understood by those skilled in the art, that various changes can be made, and equivalents can be substituted for elements thereof without departing from the scope of the present disclosure. In addition, many modifications can be made to adapt a particular situation or material to the teachings of the present disclosure without departing from the scope thereof. Therefore, it is intended that the present disclosure will not be limited to the particular embodiments disclosed herein, but that the disclosure will include all aspects falling within the scope of a fair reading of appended claims.

What is claimed is:

1. A growing media composition comprising:
   growing media; and
   a biosurfactant mixed or dispersed in the growing media at a concentration from about 0.01 to about 12 oz/yd$^3$ of growing media;
   wherein said growing media composition, when applied to a plant or agricultural substrate, is effective for improving initial water uptake or wetting, rewetting, and/or water retention over time of said plant or agricultural substrate.

2. The growing media composition according to claim 1, wherein the biosurfactant is at least one biosurfactant selected from the group consisting of: glycolipids, lipopeptides, phospholipids, fatty acids, and polymeric surfactants.

3. The growing media composition according to claim 1, wherein the growing media is at least one selected from the group consisting of: peat, peat-like materials, sand, perlite, and vermiculite.

4. The growing media composition according to claim 1, wherein the biosurfactant is a glycolipid.

5. The growing media composition according to claim 4, wherein the biosurfactant is a glycolipid selected from the group consisting of: rhamnolipid, sophorolipid, and mannosylerythritol lipid.

6. The growing media composition according to claim 5, wherein the biosurfactant is rhamnolipid.

7. The growing media composition according to claim 1, wherein the biosurfactant is produced by mechanical and biological processes without any chemical reaction that alters a molecule of the biosurfactant.

8. The growing media composition according to claim 1, which is a plant or agricultural substrate.

* * * * *